(12) United States Patent
Bertolotti et al.

(10) Patent No.: US 9,657,720 B2
(45) Date of Patent: May 23, 2017

(54) SENSOR DEVICE FOR MEASURING AERODYNAMIC LOADS OF A ROTOR BLADE OF A WIND TURBINE

(75) Inventors: Fabio Bertolotti, Bad Bentheim (DE); Norbert Kötting, Neuenkirchen (DE)

(73) Assignee: SSB Wind Systems GmbH & Co. KG, Salzbergen (DE)

( * ) Notice: Subject to any disclaimer, the term of this patent is extended or adjusted under 35 U.S.C. 154(b) by 807 days.

(21) Appl. No.: 14/005,632

(22) PCT Filed: Feb. 22, 2012

(86) PCT No.: PCT/EP2012/000776
§ 371 (c)(1),
(2), (4) Date: Sep. 17, 2013

(87) PCT Pub. No.: WO2013/041155
PCT Pub. Date: Mar. 28, 2013

(65) Prior Publication Data
US 2014/0003942 A1    Jan. 2, 2014

(30) Foreign Application Priority Data
Mar. 19, 2011    (DE) .......... 10 2011 014 480

(51) Int. Cl.
*F03D 7/02*    (2006.01)
*F03D 11/00*    (2006.01)
(Continued)

(52) U.S. Cl.
CPC .......... *F03D 11/0091* (2013.01); *F03D 17/00* (2016.05); *F03D 80/55* (2016.05);
(Continued)

(58) Field of Classification Search
CPC ........ F03D 7/02; F03D 7/0224; F03D 7/0232; F03D 7/0244; F03D 17/00; F03D 80/55;
(Continued)

(56) References Cited

U.S. PATENT DOCUMENTS 3,415,677 A * 12/1968 Moser .................... C03C 17/10
                                                        206/454
4,264,132 A *  4/1981 Konzorr ................... B62M 3/12
                                                        359/514
(Continued)

FOREIGN PATENT DOCUMENTS

DE    EP 1500815 A1 *  1/2005 ............ B08B 1/008
DE    10 2006 002708 A1    7/2007
(Continued)

OTHER PUBLICATIONS

International Search Report (in German with English translation) for PCT/EP2012/000776, mailed May 31, 2012; ISA;EP.

*Primary Examiner* — Eric Keasel
*Assistant Examiner* — Joshua R Beebe
(74) *Attorney, Agent, or Firm* — Harness, Dickey & Pierce, P.L.C.

(57) ABSTRACT

A sensor device for measuring aerodynamic loads of a rotor blade for a wind power installation. The sensor device includes a reflector arranged in a cavity of the rotor blade which signals a signal evaluation device arranged at a distance from the reflector. The signal evaluation device detects and quantifies physical changes of the rotor blade from the reflected signal. A cleaning device for the reflector is arranged on the reflector for activation by a centrifugal force generated during the rotation of the rotor to clean the reflector.

17 Claims, 5 Drawing Sheets

(51) Int. Cl.
*G01B 11/16* (2006.01)
*G01M 5/00* (2006.01)
*G02B 27/00* (2006.01)
*F03D 80/55* (2016.01)
*F03D 17/00* (2016.01)

(52) U.S. Cl.
CPC ........... *G01B 11/16* (2013.01); *G01M 5/0016* (2013.01); *G01M 5/0041* (2013.01); *G01M 5/0091* (2013.01); *G02B 27/0006* (2013.01); *F05B 2270/804* (2013.01); *F05B 2270/821* (2013.01); *Y02E 10/72* (2013.01)

(58) Field of Classification Search
CPC ........... F05B 2270/17; F05B 2270/804; F05B 2270/8041; F05B 2270/821; Y02E 10/721; Y02E 10/722; Y02E 10/723; Y02E 10/72; A61B 1/126; B60R 1/0602; B60S 1/60; F01B 11/16; G01M 5/0016; G01M 5/0041; G01M 5/0091; G02B 27/006

See application file for complete search history.

(56) References Cited

U.S. PATENT DOCUMENTS

| | | | | |
|---|---|---|---|---|
| 4,408,991 A * | 10/1983 | Engel | ............... | A61B 1/253 433/30 |
| 5,790,298 A * | 8/1998 | Tonar | ............... | G02F 1/161 359/265 |
| 6,022,192 A * | 2/2000 | DeLaHoz | ............. | F04D 25/088 15/246 |
| 6,530,110 B1 * | 3/2003 | Breau | ................... | B60R 1/0602 15/250.003 |
| 8,548,751 B2 * | 10/2013 | Lucks | ................... | G01B 11/16 702/35 |
| 2006/0000269 A1 * | 1/2006 | LeMieux | ................ | F03D 17/00 73/170.01 |
| 2009/0035148 A1 * | 2/2009 | Livingston | ............ | F03D 1/0675 416/232 |
| 2009/0297352 A1 * | 12/2009 | Walter | ................... | F03D 1/003 416/223 R |
| 2010/0003138 A1 * | 1/2010 | Siebers | ................... | F03D 80/55 416/146 R |
| 2010/0253569 A1 * | 10/2010 | Stiesdal | ................ | G01B 11/026 342/118 |
| 2012/0002038 A1 * | 1/2012 | Furrer | ................... | A45D 31/00 348/129 |
| 2013/0093879 A1 | 4/2013 | Bertolotti | | |

FOREIGN PATENT DOCUMENTS

| | | |
|---|---|---|
| DE | 10 2009 007 938 A1 | 8/2010 |
| DE | 10 2010 017 749 A1 | 1/2012 |
| DE | 10 2011 011 392 A1 | 8/2012 |
| EP | 2 141 354 A2 | 1/2010 |
| EP | 2 239 462 A1 | 10/2010 |
| GB | 2 248 014 A | 3/1992 |
| WO | WO-2010/054661 A2 | 5/2010 |

* cited by examiner

SENSOR DEVICE FOR MEASURING AERODYNAMIC LOADS OF A ROTOR BLADE OF A WIND TURBINE

CROSS-REFERENCE TO RELATED APPLICATIONS

This application is a 371 U.S. National Stage of International Application No. PCT/EP2012/000776, filed Feb. 22, 2012, and claims priority to German Patent Application No. 10 2011 014 480.3, filed Mar. 19, 2011, the disclosures of which are herein incorporated by reference in their entirety.

TECHNICAL FIELD

The invention relates to a sensor device for measuring aerodynamic loads of at least one rotor blade of a wind turbine according.

BACKGROUND

Due to the increase in length and flexibility of rotor blades in wind turbines, the controllers of these are having to work increasingly hard to measure the aerodynamic loads of one or a plurality of rotor blades occurring during operation. Loads or deformations of the rotor blades are mainly caused by aerodynamic forces. Direct measurement of the aerodynamic loads is not possible, however. Since the bending of the blade and the twisting of this and the blade load are closely related to one another, information on these undesired deformations forms a useful starting point to determine whether these deformations are for example due to a misalignment of the rotor axis in relation to the wind direction or to vertical or horizontal wind shears.

The measurement of the loads of a rotor blade during operation usually takes place using sensor devices, which are arranged in a cavity of the rotor, or of the rotor blade or also in a fixed machine housing (gondola) of the wind turbine. From a signal source signals are sent to a reflector arranged at a distance from this, which are then reflected by this and sent to a receiver similarly arranged at a distance from the reflector. In the receiver, the deflected signals are evaluated and if necessary converted by a processing unit into measured values. The receiver and processing unit are referred to in the following as the signal evaluation device.

The spatial displacements of markings on the reflector surface caused by the aerodynamic loads can thus be detected and quantified by the signal evaluation unit. The signal evaluation unit can, for example, be a so-called non-contact distance measuring device in the form of a laser, a camera or similar arrangements. The evaluation device can be arranged either in the cavity of the rotor, or of the blade or even by use of suitable transmission means in the fixed machine housing (gondola) of the installation. The signals can be optical, sonar, laser or electromagnetic signals. The reflector is usually a so-called retroreflector, which is arranged symmetrically about the blade axis and secured to the blade.

Examples of such generic sensor devices with a reflector and a signal evaluation device in the cavity of a rotor blade are described in EP 2 239 462 A2 DE (non-contact distance measuring device), DE 10 2009 007 938 A1 (optical sensor) or WO 2010054661 A2 (signal evaluation device in the gondola).

There are two influencing variables that have a substantial effect on the accuracy of the measurements of the sensor devices described above in the cavity of the rotor area of the wind turbine: firstly, the movement of the signal evaluation devices caused by the aerodynamic loads, e.g. with an optical system, if the camera itself moves due to the load, and secondly due to soiling of or damage to the reflector during operation.

Any movement of the signal evaluation device can be prevented by fixed positioning of the device or compensated by a reference point measurement. With reference point measurement, by means of an additional measurement of a distance to a fixed point (for example the distance to the blade root) the movement of the signal evaluation device is calculated. In this regard see the as yet unpublished German patent applications DE 10 2010 017 749.0 and DE 10 2011 011 392.4 of the applicant.

The second influencing variable concerns possible soiling of and damage to the reflector in the rotor area of the wind turbine. This area is relatively inaccessible. This is in particular true of the cavity of the rotor blade, which narrows towards the blade tip. The reflector of the sensor device is arranged at a distance from the blade root in the direction of the blade tip in this inaccessible cavity of the blade.

Soiling of or damage to the reflector are caused by dust, deposits of dirt or detached parts flying around in the rotor area, which can have various causes. These may be residues from the blade manufacture, machine parts coming loose or even tools. On the reflector surface over time dirt deposits accumulate from machine oil or other dirt particles. These deposits cause a deviation in the incoming and reflected signals, resulting in the signals detected being wrong and incorrect measurements being recorded and quantified.

SUMMARY

The object of the invention is for a sensor device of the stated type, to prevent soiling of the reflector surface and thus a possible source of errors in the measurement of the aerodynamic loads.

The object is achieved in connection with the embodiments of a sensor device as set forth in the pending claims. Advantageous configurations of the solution according to the invention are specifically provided in the dependent claims.

With the arrangement of a reflector cleaning device for the reflector that is activated as a function of the speed of the rotor hub, the possibility is created during operation to carry out at regular intervals, a quasi-automated self-cleaning of the reflector without taking the wind turbine out of service. The cleaning device is almost self-controlled by the position of the rotor blades. It can even be activated when the installation is at a standstill, on condition that the corresponding rotor blade is arranged with the cleaning device in such a way that the cleaning device can be activated by gravitational force. The cleaning device is activated when the rotor blades are rotating slowly and quickly as a result of the centrifugal force occurring during rotation. External control of the cleaning device is no longer necessary.

In a first advantageous configuration of the invention the cleaning device is activated by an activation device, which is operated by centrifugal force. The activation takes place by an increase in hydraulic or pneumatic pressure with increasing centrifugal force. In this configuration the cleaning device comprises a spray device that is connected via a line to a storage tank filled with cleaning agents. Activation can take place, for example, in that at a particular rotor position, e.g. when the position of a rotor blade is above the rotor axis, the pressure in the line increases and thus via a pressure control valve in the line the cleaning agent is sprayed by the line onto the reflector thereby cleaning the latter.

Irrespective of the configuration of the cleaning device with pneumatically or hydraulically activated operation the reflector advantageously has a reflector surface which is arranged substantially transversally to the signal path, and is cleaned by the cleaning device.

For better protection from dirt particles flying around in the rotor, in the direction of the signal evaluation device the reflector is provided with a protective shield arranged in front of the reflector surface and which does not interfere with the signals. To avoid additional interruptions/reflections of the signals at the interface between the protective shield and the reflector surface, which would further falsify the measurement result of the sensor device, it is proposed that the protective shield together with the reflector surface forms a solid bond that is impenetrable to air. Avoidance of signal interruptions/straying at the interfaces between the protective shield and the reflector surface thus also affects the choice of material for the protective shield.

At the sensor device with the protective shield the surface of the protective shield pointing in the direction of the evaluation device is cleaned, i.e. the cleaning device is arranged on the shield surface.

For greater protection against mechanical damage the reflector together with the protective shield is installed in a separate housing. The front of the housing, which faces in the direction of the evaluation device, is covered by the protective shield. At the edge of the housing the cleaning device is arranged, which as a function of the centrifugal force acting on the reflector or the housing, cleans the surface of the protective shield arranged in the direction of the evaluation device.

To improve the activation of the cleaning device it is further advantageous, if in the configuration of the reflector with the protective shield this is arranged in relation to the reflector surface in a plane that is angled and opening out to the beam path.

In the configurations of the invention up to this point it has been assumed that the cleaning device is directly activated as the speed of the hub increases. Activation of the cleaning device can also take place advantageously at different speeds. This is of particular importance for the precise measurement of the aerodynamic load of the rotor blades, in order to avoid measurement errors due to activation of the cleaning device if the signal path is temporarily obscured by the cleaning process.

In a further advantageous configuration of the invention, therefore, it is proposed that, by means of centrifugal force, the cleaning device can be and/or is activated by a hub rotating at low speed, and by a hub rotating at high speed can be blocked or is blocked. Where the rotor hub of the wind turbine is rotating slowly, no evaluation of the sensor system is necessary, since in this case the aerodynamic loads of the wind turbine are very low and have no role to play. It is therefore a disadvantage if when the reflector surface is being cleaned by the cleaning device the incoming or reflected signals are disturbed by the cleaning process. Where the hub is rotating quickly, if the evaluation of the sensor system is necessary, the cleaning device is deactivated so that the signal path is not disturbed.

The degree of soiling of the reflector surface can for example be determined directly by means of a detection device, which can be combined with the wind turbine controller and in conjunction with the rotor speed activate the cleaning device. As an alternative, the degree of soiling can be determined from the change in the reflected signal upon reaching the signal evaluation device. This is, for example, the case with a camera-based optical system, if the brightness or other characteristics of the reflected light exceed or fall below certain levels. In this case in combination with the rotor speed, the cleaning device can then be activated. For other signal types, similar detection devices for determining the level of soiling of the reflector surface in combination with the rotor speed can be created, In a particularly advantageous configuration of the invention the cleaning device comprises a wiping device with a wiper arm that can be swivelled over the reflector surface. Wiper operation takes place exclusively by rotational and acceleration forces on the reflector, so that an additional operating device for the cleaning device coupled to the higher-level wind turbine controller can be dispensed with. The wiper device is designed in such a way that when the rotor hub is rotating slowly, if in this case the force of gravity is predominant, the wiper arm is activated by the force of gravity and if the hub is rotating quickly, if in this case the centrifugal force acting outwards is predominant, the wiper arm is pushed against a stop arranged on the lateral edge of the reflector surface, is blocked and thus remains in its starting and rest state, in order not to conceal the signal path of the incoming and reflected signals by wiper movements on the reflector surface and thus falsify the measurement values.

The wiper arm advantageously has a wiper lip pointing in the direction of the reflector surface in the form of, for example, a layer of felt, wherein the wiper arm can be swivelled and/or is swivelled from the starting positioning into a wiping position over the reflector surface. Operation of the wiper arm when the hub is rotating slowly takes place in an angular position of the rotor blade above the hub axis of the wind turbine by the force of gravity acting on the wiper arm. The wiper arm moves from the starting position into the wiping position and strokes the reflector surface which in the process is cleaned of dirt particles. If on the other hand during further (slow) rotation of the hub the rotor blade reaches an angular position located below the rotor axis, then a swivel movement of the wiper arm back to the starting position takes place. For each complete rotation of the rotor blade through 360°, therefore a swivel movement of the wiper arm across the reflector surface occurs. The signal paths concealed during this process are irrelevant for measurement of the aerodynamic load, however, since in this rotor speed range they are negligibly small.

For better activation of the wiper arm device by gravity, the reflector surface, as in the configuration described above, is preferably arranged obliquely to a cross-sectional profile of the rotor blade with an angle opening out to the blade axis. Here the wiper arm can be adjusted by weights or other similar measures such that the wiper lip for each swivel movement always rests on the reflector surface.

Where the rotor hub and the rotor blades secured to it are rotating quickly, if the evaluations of the sensor system are required, the force of gravity acting on the wiper arm is dominated by the centrifugal force acting in the direction of the tip of the blade. As a result of this force the wiper arm mounted laterally on the reflector surface is always pushed outwards against a stop and thus remains in its starting and rest position. The reflector surface is not concealed, the incoming and reflected signals are not influenced and the measurement of the aerodynamic load of the system when there is a strong wind or a gust of wind is not impaired.

Where the cleaning device is configured as a wiper device for the configuration of the reflector the same embodiments can be applied as for the above-mentioned configuration with the spray device. Thus the reflector can be arranged in a housing, provided with a protective shield in the direction of the evaluation device. On the edge of the housing or the protective shield the wiper device is then arranged, wherein the wiper arm in this configuration wipes the protective shield.

To improve the swivelling movement of the wiper arm it is further advantageous, if in the configuration of the reflector with the protective shield the latter is arranged in relation to the reflector surface in a plane that is angled and opening out to the beam path. This arrangement prevents an unintentional activation of the wiper arm when there is a high centrifugal force acting on the reflector—that is at high rotor speeds. At low rotor speeds and when gravity becomes effective an unintentional blocking of the wiper arm is prevented in this way.

The invention further relates to a wind turbine with a rotor which can rotate about a rotor axis as a result of the wind, comprising a rotor hub and at least one rotor blade secured to the rotor hub and extending from this in a direction substantially transversally to the rotor axis, and at least one electrical generator, which is mechanically coupled to the rotor and can be driven by this, wherein the wind turbine comprises a sensor device and a cleaning device in all the above-mentioned configurations according to the invention, which is integrated into such a system and which determines the aerodynamic loads on the rotor blades caused by the wind and weather.

BRIEF DESCRIPTION OF DRAWINGS

Further advantageous configurations of the invention result from two exemplary embodiments of the invention shown in the drawings.

DETAILED DESCRIPTION

Figure 1:
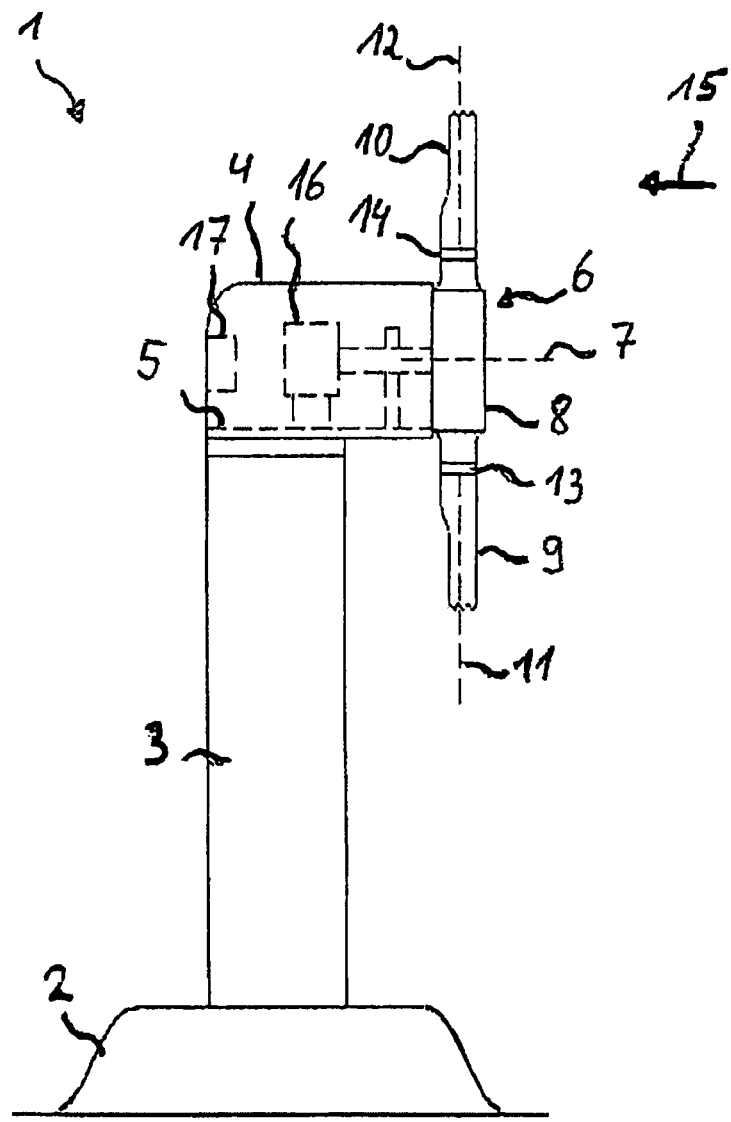
FIG. 1 is a schematic view of a wind turbine.

In FIG. 1 a wind turbine 1 can be seen, wherein a tower 3 standing on a foundation 2 at its end facing away from the foundation 2 is connected to a machine housing 4. In the machine housing 4 a machine support 5 is arranged, upon which a rotor 6 is mounted rotatably about a rotor axis 7, having a rotor hub 8 and rotor blades 9 and 10 connected thereto, which in each case can rotate about their blade axes 11, 12 relative to the rotor hub 8. Each rotor blade 9, 10 is mechanically coupled to an adjusting drive 13, 14, by means of which the respective rotor blade 9, 10 is rotated about the associated blade axis 11, 12 and is mechanically coupled to an electric generator 16, which is arranged in the machine housing 4 and secured to the machine support 5 and which converts the wind power 15 acting on the individual rotor blades to the largest possible extent into electrical energy. For the controlled operation of the wind turbine 1 a higher order wind turbine controller 17 is provided, by means of which inter alia the adjusting drives 13 and 14 are controlled.

Figure 2:
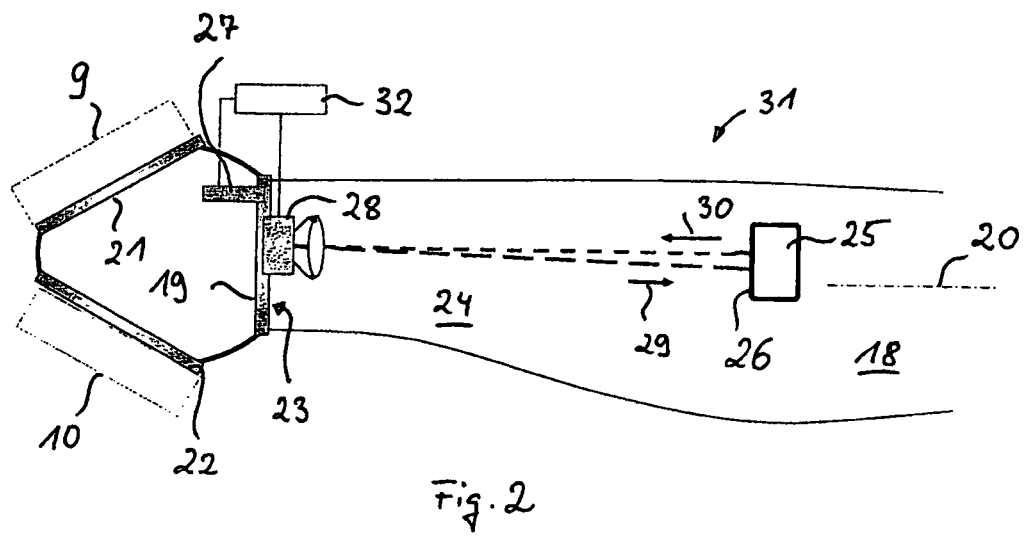
FIG. 2 is a general schematic and partial representation of a rotor from the wind turbine shown in FIG. 1 with a sensor device for the deformation of the rotor blade of a wind turbine.

FIG. 2 shows a schematic and partial representation of the rotor 6 in the line of sight of FIG. 1, wherein on the rotor hub 8 a third rotor blade 18 is mounted rotatably by means of a blade bearing 19. The rotor blades 9 and 10 similarly have blade bearings 21 and 22 as shown in FIG. 2. In FIG. 1 the rotor blade 18 is concealed by the rotor hub 8. Like the rotor blades 9 and 10, rotor blade 18 is also mechanically coupled to a schematically indicated blade angle adjustment drive 27 and by means of this can rotate about the blade axis 20.

FIG. 2 further shows a sensor device 31 for measuring the deformation of the rotor blade of the wind turbine 1, which is fully or partially integrated in the rotor 6. By means of the device 31 an aerodynamic load of the rotor blade 18 is measured. The end of the rotor blade 18 secured to the blade bearing 19 is referred to as the blade root 23.

The sensor device 31 comprises a reflector 25 arranged in a cavity 24 of the rotor blade 18 which at a distance from the blade root 23 receives incoming signals from a signal evaluation device 28 and on its surface 26 facing the incoming signals reflects these and sends them back to the evaluation device 28. The evaluation device 28 is arranged in the area of the blade bearing 19 and has a fixed reference point in respect of the blade root 23. This prevents possible movements of the evaluation device influencing the measurement of the deformation of the rotor blade 18.

In FIG. 2 the signals leaving the signal evaluation unit 28 from left to right are indicated by an arrow 29, and the reflected signals leaving the reflector surface 26 to the left back towards the evaluation device 28 are indicated by arrow 30. The signal arriving at the reflector 25 generates a mark on its surface 26. As a result of the aerodynamic load the blade 18 is deformed, and the deformation results in a displacement of the mark on the reflector surface 26. This displacement is recorded in the signal evaluation device 28.

The signal evaluation device 28 is also connected with a computation and signal processing unit 32, which also quantifies the reflected signals 30 and converts them into measured values. The signal processing unit 32 is also connected with the adjustment drive 27. Furthermore there is a connection (not shown) to the wind turbine controller 17. The values determined by the computation and signal processing unit 32 thus form control variables for the blade adjustment drive 27 or for the other operating parameters of the wind turbine 1.

The sensor device 31 referred to in the exemplary embodiment according to FIG. 2 works on the basis of an optical system, in which the signals 29, 30 are light beams, originating from a light source, which are parts of the above-mentioned signal evaluation device 28. The optical system comprises camera-based systems or arrangements of lasers. The beams (signals) generated by a light source generate on the reflector 25 a light mark which, as a result of the blade deformation, displaces spatially on the reflector surface 26. The displaced mark is recorded via the reflected light beam signal 30 in the signal evaluation device 28. The data on the deformation are then converted in the computation and signal processing unit 32 into measured values.

Instead of the above-mentioned optical system, wireless electromagnetic or sonar systems can also be used having a corresponding transceiver unit and a correspondingly designed reflector.

Figure 3:
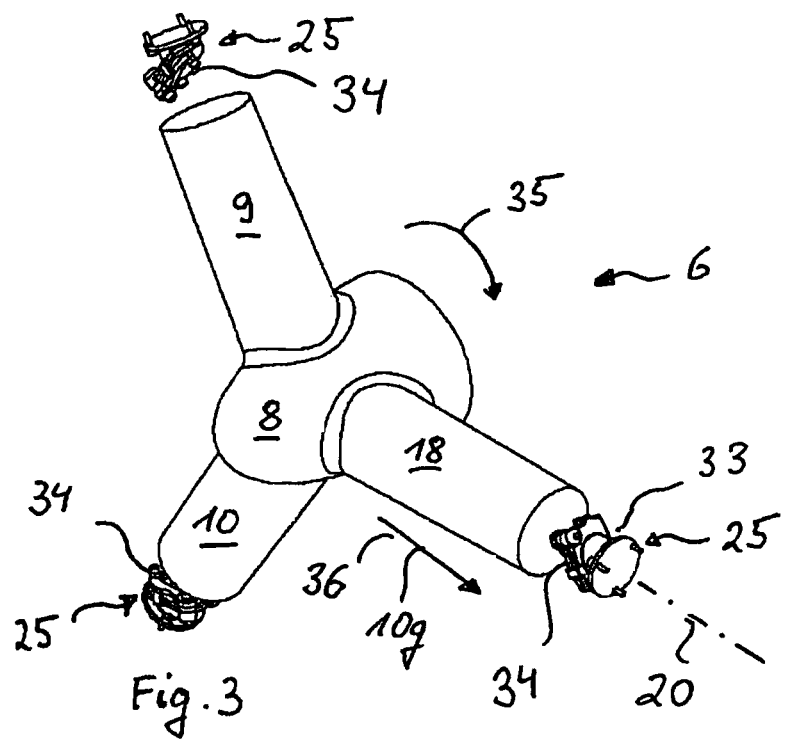
FIG. 3 shows a perspective view of the rotor of the wind turbine with schematically arranged reflectors of the sensor device for each rotor blade for a rapidly rotating hub.

FIG. 3 shows a perspective view of the rotation 35 of the rotor 6 of the wind turbine 1 with schematically arranged reflectors 25 for each rotor blade 9, 10 and 18 with a rapidly rotating hub 8. Since the reflectors in the rotor blades 9 and 10 are the same as in the rotor blade 18, they are also provided with the same references as the reflector 25 in the blade 18 of FIG. 2.

The reflector 25 is surrounded by a housing 23 (see also FIG. 6), in order to prevent mechanical damage from parts flying around in the cavity 23 of the rotor blade 9, 10, 18. The reflector surface 26 pointing in the direction of the evaluation unit 28 is arranged transversally to the blade axis 20 and has a cleaning device 34 in order to prevent accumulation of dirt deposits on the surface 26, which is explained in more detail in the remainder of the description of the figures. When the rotor 6 is rotating quickly, e.g. as a result of strong wind or a short gust of wind, a centrifugal acceleration 36 of approximately 10 g, where g=9.81 m/s² (force of gravity), acts on each reflector 25.

The cleaning device 34 is designed in a first configuration so that at high speed of the rotor it is out of service since at this speed range the respective rotor blade 9, 10, 18 is subject to bending. Activation of the cleaning device 34 in this speed range would disturb the deformation measurement and thus the measurement of the aerodynamic loads of the wind turbine 1.

This is not the case when the rotor hub 8 is rotating slowly. In this case only the force of gravity g resulting from the rotation acts on the reflector 25. Since in this range no significant aerodynamic loads arise, which can be measured, the cleaning device 34 is activated in this rotor speed range. Disturbances in the signal path of the incoming and reflected signals due to the cleaning process of the reflector are insignificant for the aerodynamic loads.

Figure 4A:
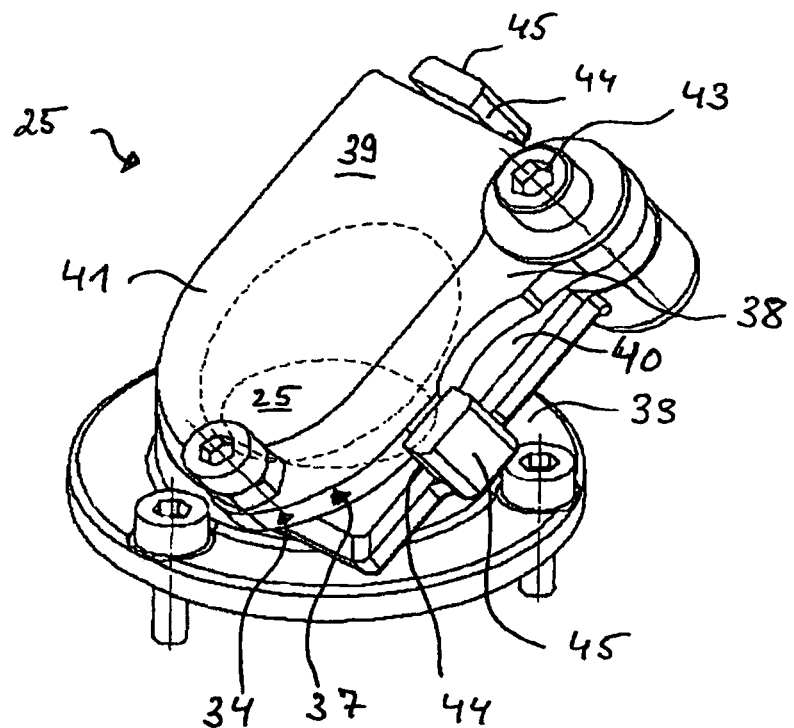
FIG. 4a and FIG. 4b show in perspective view a first embodiment of the cleaning device of a reflector of the wind turbine.
Figure 4B:
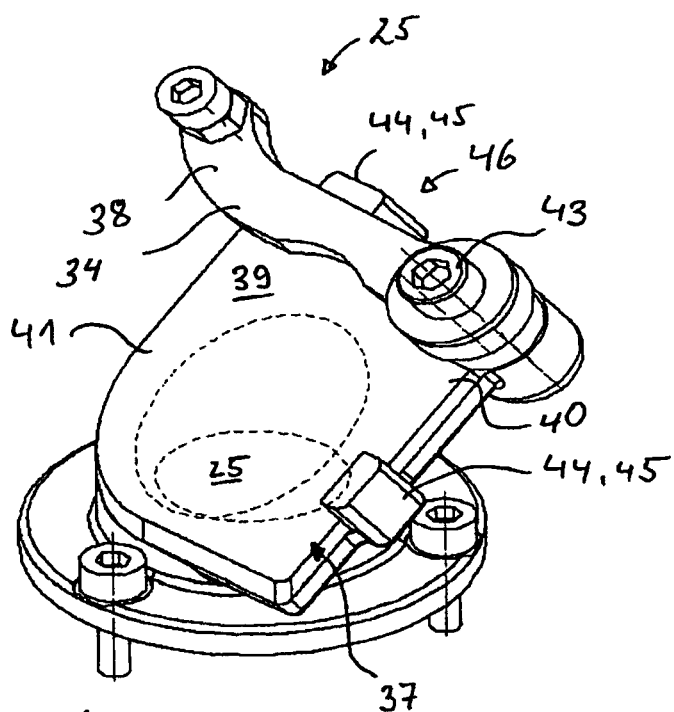

In FIGS. 4a and 4b the first embodiment of the cleaning device 34 of the reflector 25 is shown in detail. It is designed as a wiper device 37 with a wiper arm 38, swivelably mounted on the right side edge 40 of the protective housing 33. As further protection from parts flying around the surface of the housing 33 facing, the signal evaluation device 28 is provided with a protective shield 39, which in respect of the reflector surface 26 and the signal device of the incoming and reflected (light) signals 29, 30 is arranged in a plane that is angled and opens out to the beam path (see FIG. 5). The protective shield 39, together with the reflector surface 26, forms a solid bond that is impenetrable to air so that the incoming and outgoing signals 29, 30 are not falsified. The reflector 25 is arranged in a cavity in the inside of the housing 33 and covered by the protective shield 39.

The wiper arm 38 has a sealing lip 42 on its side directed towards the protective shield surface 41 (see FIG. 5a), which consists of a layer of felt and wipes the shield surface 41. FIG. 4a shows the starting or rest position of the wiper arm 38. The mounting point 43 of the wiper arm 38 is arranged on the (right) side of the housing 33. The arm 38 swivels from the starting and rest position shown in FIG. 4a through the slow rotation of the rotor blade 9, 10, 18 about the rotor axis 7 (FIG. 3) in a clockwise direction into the wiping position 46 shown in FIG. 4b, wherein as a result of this process the protective shield surface 41 is cleaned. In a further rotor rotation as a result of the force of gravity g a return movement to the rest or starting position according to FIG. 4a then, in turn, takes place. The wiper device 37 has a stopper 44 at each of the respective starting and rest positions of the wiper arm 38 according to FIG. 4a (bottom) and FIG. 4b (top), which stopper 44 takes the form of a stop 45 directed vertically to the protective shield surface 41.

Since the wiping process takes place at the low rotor speed range, the deformation of the rotor blade concerned is so slight that no measurement of the aerodynamic load is necessary. Concealment of the signal path 29, 30 and thus a possible falsification of the measurement result by the wiping process is therefore irrelevant.

Figure 5A:
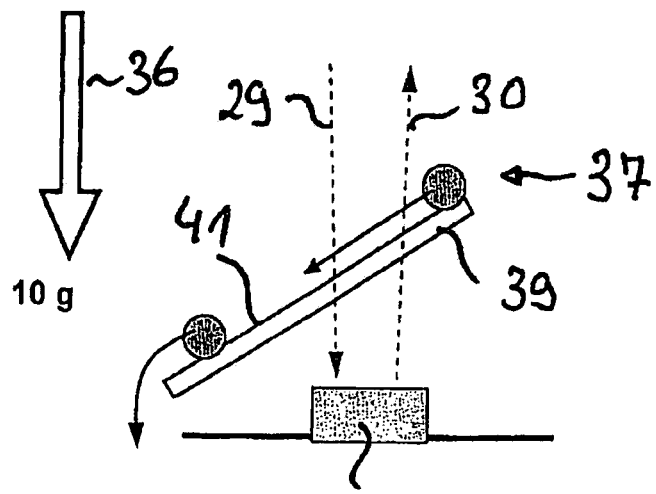
FIGS. 5a and 5b show in a schematic view the way in which the cleaning device according to FIGS. 4a and 4b operates at high and low rotor speeds of the wind turbine.
Figure 5B:
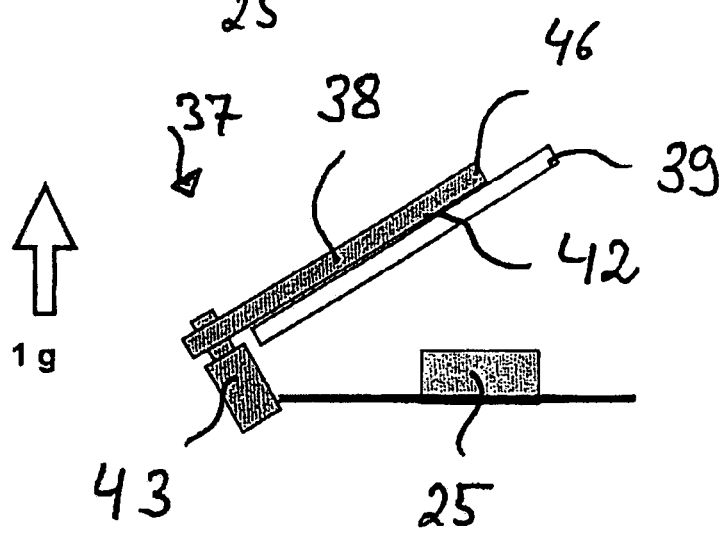

FIGS. 5a and 5b are schematic representations of the wiper device 37 at high speed (FIG. 5a) and at low speed (FIG. 5b). FIG. 5a shows how at high speed the centrifugal force 36 has a substantial effect, pushing the wiper arm 38 outwards into the rest or starting position at the edge of the housing 40. The wiper arm 38 is pushed outwards against the top or bottom stopper 44 or stop 45, as shown in FIGS. 4a and 4b. The wiper device 37 is inactive and does not cover the reflector 25.

FIG. 5b shows how the wiper device 37 works at low rotor speed in the wiping position, that is to say in the position in which the wiper arm 38 wipes directly over the shield surface 41 cleaning it of dirt particles. Since no sensor evaluation of the blade deformation is required, the cleaning function of the wiping has no effect on the measurement result of the sensor device 31.

Figure 6:
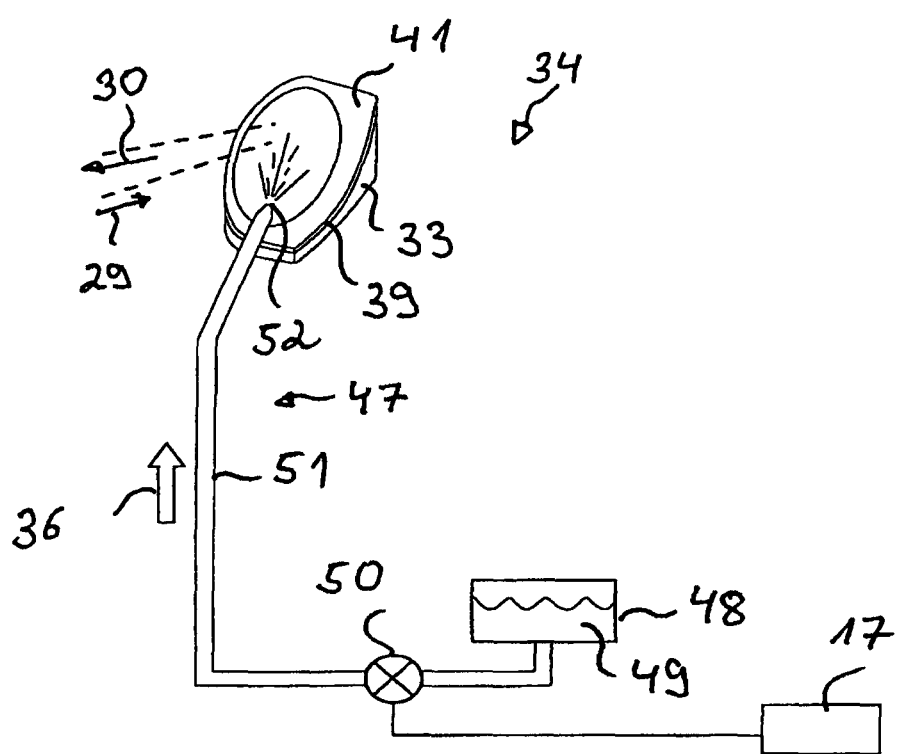
FIG. 6 shows a schematic view of a second embodiment of the cleaning device of the reflector of the wind turbine.

FIG. 6 shows a schematic view of a second embodiment of the cleaning device of the reflector 25 of the wind turbine 1. The cleaning of the reflector 25 or of the reflector surface or of the protective shield 39 takes place in this configuration by means of a spray device 47, which is activated by means of an activation device 50, wherein the activation takes place by an increase in hydraulic or pneumatic pressure at increasing speed and thus increasing centrifugal force 36. The activation device 50 is connected with the wind turbine controller, which monitors and controls the rotor speed by means of revolution counters. Cleaning of the reflector 25 or of the reflector surface 26 or of the protective shield surface 41 takes place by means of a spray device 47.

By means of the activation device 50, as a function of the acting centrifugal force 36, e.g. as a function of the rotor speed, a cleaning agent 49 stored in a tank 48 arranged in the rotor, via a line 51 and a discharge nozzle 52 arranged on the edge of the reflector is sprayed onto the corresponding surface of the reflector, thereby cleaning it. As an activation device by way of example a pressure control valve 17 coupled to the wind turbine controller 17 can be used. At the corresponding rotor speed the pressure generated in the line 51 as a result of centrifugal force increases so that cleaning agent 49 flows through the line 51 via the pressure control valve and is distributed via the discharge nozzle 52 over the shield surface 39.

The embodiment of the cleaning device shown in FIG. 6 can also be provided with a wiper device according to FIG. 4a and FIG. 4b, in order to achieve a better cleaning result. Furthermore, conversely, the wiper device shown in FIG. 4a and FIG. 4b can also be provided with a spray device according to FIG. 6.

It is obvious to a person skilled in the art to provide for the activation of the cleaning device as a function of the rotor speed, for sensor devices that are also arranged in other components of the wind turbines if, for example, the evaluation device for the reflecting signals is not arranged in the rotor, but in the stationary machine housing (gondola), the tower or in another component of the installation.

Furthermore, the term "signal" used in the description covers all possible wireless signals such as optical beams, including laser beams (LIDAR systems), electromagnetic and sonar signals (SODAR systems).

The invention claimed is:

1. A sensor device for measuring aerodynamic loads of a wind turbine rotor blade comprising:
    a reflector arranged in a cavity of a rotor blade extending from a rotor hub;
    a signal evaluation device arranged at a distance from the reflector and operable to receive a signal from the reflector, the signal evaluation device detecting and quantifying a physical change of the rotor blade from the reflector signal; and
    a cleaning device associated with the reflector for cleaning the reflector, the cleaning device activated by a centrifugal force during rotation of the rotor hub; and
    wherein the cleaning device is operable for activation when the rotor hub is rotating slowly and deactivation when the rotor hub is rotating quickly.

2. The sensor device of claim 1 wherein the reflector has a reflector surface arranged substantially transverse to a path of the signal and which is cleaned by the cleaning device.

3. The sensor device of claim 2 wherein the reflector in a direction of the signal evaluation device comprises a protective shield arranged in front of the reflector surface and which does not interfere with the signal, a surface of the protective shield points in the direction of the signal evaluation device and is cleaned by the cleaning device.

4. The sensor device of claim 3 wherein the protective shield, together with the reflector surface, forms a solid bond that is impenetrable to air.

5. The sensor device of claim 3 wherein the reflector and the protective shield are arranged in a housing.

6. The sensor device of claim 5 wherein the protective shield forms a cover for the housing arranged in the direction of the signal evaluation device and the cleaning device is arranged on the surface of the protective shield pointing in the direction of the signal evaluation device.

7. The device of claim 3 wherein the protective shield is arranged in relation to the reflector surface in a plane that is angled and opens out in the direction of a signal path.

8. The sensor device of claim 3, wherein the cleaning device comprises a wiper device with a wiper arm operable to swivel back and forth across a reflector surface, and wherein the wiper arm in its starting position is supported adjacent a side edge of the protective shield surface and in a wiping position rotates over the protective shield surface.

9. The sensor device of claim 1, wherein the cleaning device comprises a wiper device with a wiper arm operable to swivel back and forth across a reflector surface.

10. The sensor device of claim 9, wherein the wiper arm further comprises a sealing lip pointing in the direction of the reflector surface, wherein the wiper arm is rotatable from a starting position into a wiping position over the reflector surface, and in the starting position is arranged at a side edge of the reflector surface.

11. The sensor device of claim 9, wherein the wiper arm is activated as a function of rotor hub rotation.

12. The sensor device of claim 11, wherein the wiper arm only wipes across the reflector surface when the rotor hub is rotating at low speeds and remains in the starting position when the rotor hub is rotating at high speeds.

13. The sensor device of claim 12, wherein at low rotor speed the wiping across the reflector surface takes place by means of the force of gravity (g) acting on the reflector as a result of rotation of the rotor blade.

14. The sensor device of claim 11, wherein the wiper arm remains in the starting position when the centrifugal force acting on the reflector is high.

15. The sensor device of claim 1 in combination with wind turbine comprising:
    a rotor that can rotate about a rotor axis by wind power, the rotor having a rotor hub and at least one rotor blade secured to the rotor hub and extending therefrom in a direction substantially transversal to the rotor axis;
    at least one electrical generator, which is mechanically coupled to the rotor and driven thereby.

16. A sensor device for measuring aerodynamic loads of a wind turbine rotor blade comprising:
    a reflector arranged in a cavity of a rotor blade extending from a rotor hub;
    a signal evaluation device arranged at a distance from the reflector and operable to receive a reflector signal from the reflector, the signal evaluation device detecting and quantifying a physical change of the rotor blade from the reflector signal;
    a cleaning device associated with the reflector for cleaning the reflector, the cleaning device being activated by a centrifugal force generated during rotation of the rotor hub, the cleaning device being activated in response to an increase in hydraulic or pneumatic pressure with increasing centrifugal force.

17. The sensor device of claim 16, wherein the cleaning device comprises a sprayer having a storage tank adapted to be filled with a cleaning agent, an activation unit that responds to the centrifugal force, and a line in fluid communication between the storage tank and a discharge nozzle arranged on the sensor device.

* * * * *